United States Patent
Murugesan et al.

(10) Patent No.: US 10,521,222 B2
(45) Date of Patent: Dec. 31, 2019

(54) HYBRID SYSTEM FOR REMOTE APPLICATION DEVELOPMENT

(71) Applicant: Bank of America Corporation, Charlotte, NC (US)

(72) Inventors: Sangeethkumar Murugesan, Chennai (IN); Sudheer Ganti, Hyderabad (IN); Debraj Goswami, Hyderabad (IN); Balakrishna Pillalamarri, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 142 days.

(21) Appl. No.: 15/407,742

(22) Filed: Jan. 17, 2017

(65) Prior Publication Data
US 2018/0203689 A1    Jul. 19, 2018

(51) Int. Cl.
*G06F 8/71*    (2018.01)
*H04L 29/08*    (2006.01)

(52) U.S. Cl.
CPC ........... *G06F 8/71* (2013.01); *H04L 67/10* (2013.01); *H04L 67/1095* (2013.01); *H04L 67/34* (2013.01)

(58) Field of Classification Search
CPC ..... G06F 8/70; G06F 8/60; G06F 8/71; H04L 67/10
See application file for complete search history.

(56) References Cited

U.S. PATENT DOCUMENTS

| | | |
|---|---|---|
| 5,377,309 A | 12/1994 | Masayuki et al. |
| 5,729,746 A | 3/1998 | Leonard et al. |
| 5,801,687 A | 9/1998 | Peterson et al. |
| 6,018,627 A | 1/2000 | Iyengar et al. |
| 6,038,393 A | 3/2000 | Iyengar et al. |
| 6,493,868 B1 | 12/2002 | DaSilva et al. |
| 6,553,563 B2 | 4/2003 | Ambrose et al. |
| 6,851,107 B1 | 2/2005 | Coad et al. |
| 6,865,429 B1 | 3/2005 | Schneider et al. |
| 7,127,713 B2 | 10/2006 | Davis et al. |
| 7,130,880 B1 * | 10/2006 | Burton .................. H04L 63/104 709/203 |
| 7,437,712 B1 | 10/2008 | Brown et al. |
| 7,644,390 B2 | 1/2010 | Khodabandehloo et al. |
| 7,694,291 B2 | 4/2010 | Chen et al. |
| 7,752,606 B2 | 7/2010 | Savage |
| 7,761,848 B1 | 7/2010 | Chaffin |
| 8,001,519 B2 | 8/2011 | Conallen et al. |
| 8,327,351 B2 | 12/2012 | Paladino et al. |
| 8,392,912 B2 | 3/2013 | Davis et al. |
| 9,047,130 B2 | 6/2015 | Chen et al. |

(Continued)

*Primary Examiner* — Wei Y Zhen
*Assistant Examiner* — Amir Soltanzadeh
(74) *Attorney, Agent, or Firm* — Michael A. Springs; Moore & Van Allen PLLC; James C. Edwards

(57) ABSTRACT

A hybrid system for software development in which dynamic content processing occurs locally at each developer's computing device, while static content processing occurs remotely via a network-based software deployment server. Moreover, the system provides for multiple designer-specific websites to be created within a network-based Common Internet File System (CIFS) so that developers can work in parallel. Further, file/code transfer between the network-based deployment server and the local computing devices occurs seamlessly and in real-time, so that processing delays are minimized.

7 Claims, 5 Drawing Sheets

(56) References Cited

U.S. PATENT DOCUMENTS

| | | | |
|---|---|---|---|
| 2003/0037173 A1* | 2/2003 | Pace | G06F 8/60 |
| | | | 719/310 |
| 2003/0135842 A1 | 7/2003 | Frey et al. | |
| 2007/0240102 A1 | 10/2007 | Bello et al. | |
| 2012/0180024 A1* | 7/2012 | Gonzalez | G06F 8/71 |
| | | | 717/109 |
| 2014/0095666 A1* | 4/2014 | Yampanis | G06F 17/30197 |
| | | | 709/219 |
| 2015/0154012 A1* | 6/2015 | Wolfram | G06F 8/60 |
| | | | 717/176 |
| 2017/0003960 A1* | 1/2017 | Subramanian | G06F 8/76 |

* cited by examiner

HYBRID SYSTEM FOR REMOTE APPLICATION DEVELOPMENT

FIELD

The present invention relates to software development and, more specifically, a hybrid system for remote software/application development, whereby dynamic software development processing occurs locally at each developer's computing device and static software processing occurs remotely via a network-based software deployment server.

BACKGROUND

In large enterprises, software is developed as a collaborative effort amongst a plurality of developers assigned to a specific software/application development project. For example, depending on the complexity of the software/application project, the team may include upwards of 20 or more developers, who work in parallel to develop the software. In worldwide enterprises, the team of developers may be spread across various locations, including different states and/or countries. Such software development, which includes multiple developers located in geographically different locations, poses many unique problems.

A typical software development environment necessitates a complex set-up in which the final production/use environment needs to be mimicked at the development level. In other words, developers need to develop the software/application in an environment that simulates the final production environment, for example, a web server environment. Such a final production/use environment provides for the software to be ready for use and hosted on remote servers.

In most software development environments each developer has their respective local computing device (i.e., personal computer, laptop or the like) configured with the same development software as all of the other developers working on a project. For example, the local computing devices may be configured as both an application development server to enable coding and an application deployment server that mimics the deployment environment and enables debugging of the application while the software/application is being developed. As changes are made to the software, the developer check-ins their respective changes to a central repository (i.e., source control system), which synchronizes the various updates/check-ins from the various developers and correlates the synchronized updates with a stored baseline version of the software/application being developed. When the developer desires to continue the development process, the developer check-outs, from the repository, the latest baseline version of the software/application, which reflects the latest check-ins.

However, creating a software development environment in which each local computing device is set-up to mimic the final production environment, i.e., act as a web server, is not only highly resource dependent but also poses significant problems from a risk standpoint. This is because, in a large enterprise different device-types are classified differently in terms of the rules and regulations that apply to the devices. Specifically, desktop computing devices or the like are governed by one set of rules/regulations, while enterprise class servers are governed by an entirely different set of rules/regulations. Such rules and regulations may affect which devices receive patches or updates, the timing for deploying patches/updates on a device and the like. If a developer's computing device, e.g., workstation/desktop or the like, is being used as a deployment/web server, the server component of the developer's computing device may not meet the rules and regulations required of a server, i.e., the server component may not receive patches/updates and/or may not receive patches/updates within requisite time periods. This is because the enterprise may, in certain instances, be unaware that the local computing device (e.g., desktop or the like) is acting as a server or, in other instances, due to rules/constraints, the enterprise may be unable to deploy server-type patches/updates in the local computing/desktop environment. As such, the overall enterprise network computing environment may be exposed to risk. Moreover, in large enterprises, in which the developers may be located in disparate locations, each location (e.g., state, country or the like) may have location-specific compliance regulations/requirements including, but not limited to, government and/or legal compliance regulations. However, if the enterprise is unaware of the location of the developer and/or the classification of the device on which the software development is occurring (e.g., local device having a server component), the enterprise incurs the risk that the compliance regulations/requirements are not being met.

As a means of overcoming the compliance regulations/requirements issues that are pervasive in an enterprise in which the software development is deployed locally on developer's computing devices, enterprises have created centrally located (i.e., network and/or cloud-based) software development environments. In such software development environments, remote developments servers are deployed and each developer working on a software/application development project log-ins or otherwise accesses the remote development server to develop the software/application. While such a centrally located software development environment is conducive to small development teams, when the development team consists of a large number of developers located worldwide inefficiencies (e.g., slow response time) result from multiple developers simultaneously accessing the remote development server. This is because each keystroke that a developer enters locally on their respective computing device needs to be replicated on the remote development server and the action corresponding to the keystroke needs to be taken prior to the server responding to the locally entered input.

Therefore, a need exists to develop systems, apparatus, methods and the like for remote software development that lessens the risk exposure of the enterprise or entity developing the software and provides for an efficient means for software/application development.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus and the like for hybrid software development processing in which dynamic content processing occurs locally at each developer's computing device, while static content processing occurs remotely via a network-based software deployment server. In this regard, the invention provides for the software deployment server, for example a web server, to be removed from the local computing environment (e.g. the developer's desktop) and implemented in a remote shared server environment (e.g., a cloud-based environment or the like). As such, the present invention is able to provide for efficient code development, since the majority of the processing, i.e., the processing of dynamic content, occurs within the local computing environment, while processing of less frequent static content (e.g., content that is not dynamically rendered, such as images, page layout characteristics, style pages, and the like) occurs remotely in the shared server environment. Moreover, since application servers are deployed in a centralized environment at the network level, as opposed to being deployed locally on developer's desktops, enterprises are able to insure that the application servers are updated, in a timely fashion, with required security patches, vendor updates and the like. As such, the present invention, lessens security risks that would otherwise be posed to the enterprise by deploying application/web servers at the local/desktop/ workstation computing level.

A system for hybrid software development defines first embodiments of the invention. The system includes a distributed computing network and a plurality of computing devices (e.g., local desktops/laptops or the like) located throughout the distributed computing network. Each of the computing devices having a memory and at least one processor in communication with the memory. The computing device memory stores a first software development module and includes a software development server (e.g., a scripting language server, such as JavaServer Pages™ (JSP), Hypertext Preprocessor (PHP), Active Server Pages (ASP) or the like). The software development server is configured to process first content that has been determined by the first software development module to be of a dynamic type (e.g., content that is more frequently updated/changed as defined by predetermined rules).

The system additionally includes a computing apparatus located within the distributed computing network, which is remote from the plurality of first computing devices. In specific embodiments of the invention, the computing apparatus is a cloud-based service. The computing apparatus has a memory and at least one processor in communication with the memory. The computing apparatus memory stores a second software development module and includes a software deployment server (e.g., a web server, such as an APACHE® Server or the like). The software deployment server is configured to process second content that has been determined by the first software development module to be of a static type (e.g., content that is less frequently updated/ changed, for example, images, style pages and the like, as defined by predetermined rules).

In specific embodiments of the system, the first software development module further includes a first rules engine configured to determine, based on preconfigured rules, that software development inputs include at least one of (i) the first content of the dynamic type or (ii) the second content of the static type.

In still further specific embodiments of the system, the first development module further includes a communication sub-module that is configured to, in response to the rules engine determining that a software development input includes the second content of the static type, create, based on preconfigured rules, and initiate network communication of a static content request to the computing apparatus.

In additional specific embodiments of the system, the second software development module further includes a rules engine that is configured to (i) identify a source of a static content request received from the first software development module, (ii) determine, based on preconfigured rules, processing instructions for the static content request based on the source, and (iii) identify a destination for a response to the static content request.

Moreover, in further specific embodiments of the system, the computing apparatus further comprises a developer-specific shared drive that stores developer-specific websites, such that the shared drive provides for multiple developers to access websites simultaneously. In such embodiments of the system, the developer-specific shared drive may further comprise developer-specific code directories that are configured to receive and process the static content requests redirected from the software deployment server application. In further such embodiments of the system, the developer-specific shared drive is further configured to map developer-specific web content deployed on the shared drive to at least one of the computing devices.

Additionally, in further specific embodiments of the system, the second software development module further includes a communications sub-module configured to create, based on preconfigured rules, and initiate network communication of the response to the identified destination to the identified response destination.

In still further specific embodiments the system includes a source control sub-system located within the distributed computing network. The source control sub-system is configured to seamlessly synchronize code developed at each of the plurality of computing devices with a stored baseline of the software being developed.

An apparatus for hybrid software development defines second embodiments of the invention. The apparatus includes a plurality of computing devices (e.g., local desktops/workstations or the like) disposed throughout a distributed computing network. Each computing device having a memory and at least one processor in communication with memory. The apparatus additionally includes a software development module stored in the memory of each computing device, and executable by the at least one processor. The module includes a software development server (e.g., scripting language server, such as JavaServer Pages™ (JSP), Hypertext Preprocessor (PHP), Active Server Pages (ASP) or the like). The software development server is configured to process first content that has been determined by the software development module to be of a dynamic type.

In specific embodiments of the apparatus, the software development module further includes a rules engine configured to determine, based on first preconfigured rules, that software development inputs include at least one of first content of a dynamic type or second content of a static type. In such embodiments of the apparatus, the software development module further comprises a communication sub-module that is configured to, in response to the rules engine determining that a software development input includes the second content of the static type, create, based on second preconfigured rules, and initiate network communication of a static content request to a network-based apparatus configured to process the static content.

Another apparatus for hybrid software development defines third embodiments of the invention. The apparatus includes a computing platform (e.g., a cloud-based computing platform or the like) located within a distributed computing network. The computing platform includes a memory and at least one processor in communication with the memory. The apparatus further includes a software development module that is stored in the memory and executable by the at least one processor. The module includes a software deployment server (e.g., a web server, such as an APACHE® Server or the like). The software deployment server is configured to (i) receive static content requests from a plurality of remote computing devices located within the distributed computing network, wherein the static content requests include first content of a static type, and (ii) process the first content according to the static content request.

In specific embodiments of the apparatus the software development module further includes a rules engine configured to (i) identify a source for each of the static content requests, (ii) determine, based on preconfigured rules, processing instructions for the static content request based on the source, and (iii) identify a destination for a response to the static content request. In such embodiments the apparatus may further include a developer database that stores developer-specific processing rules for processing the static content request. In such embodiments of the invention, the rules engine is further configured to access the developer database to determine the processing instructions for the static content request based on the source of the static content request.

In further specific embodiments of the apparatus, the software development module further includes a communications sub-module configured to create, based on preconfigured rules, and initiate network communication of a static content response to the identified destination.

Thus, systems, apparatus, methods, and computer program products herein described in detail below provide hybrid software development processing in which dynamic content processing occurs locally at each developer's computing device, while static content processing occurs remotely via a network-based software deployment server. Such hybrid software development processing occurs on-the-fly in a seamless, transparent fashion, such that, the developers are unaware that portions of the processing are occurring, in real-time, remotely.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
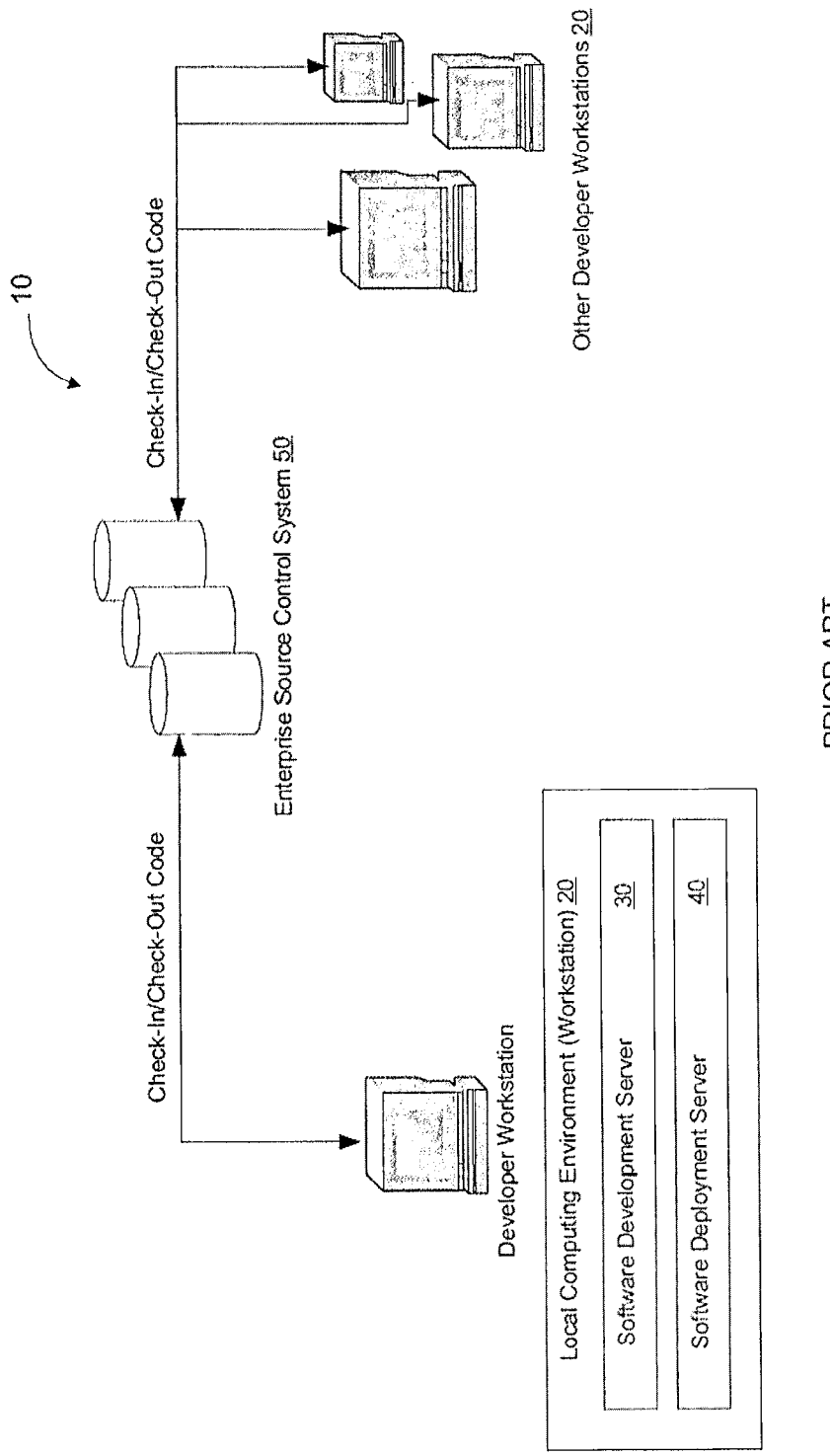
Figure 2:
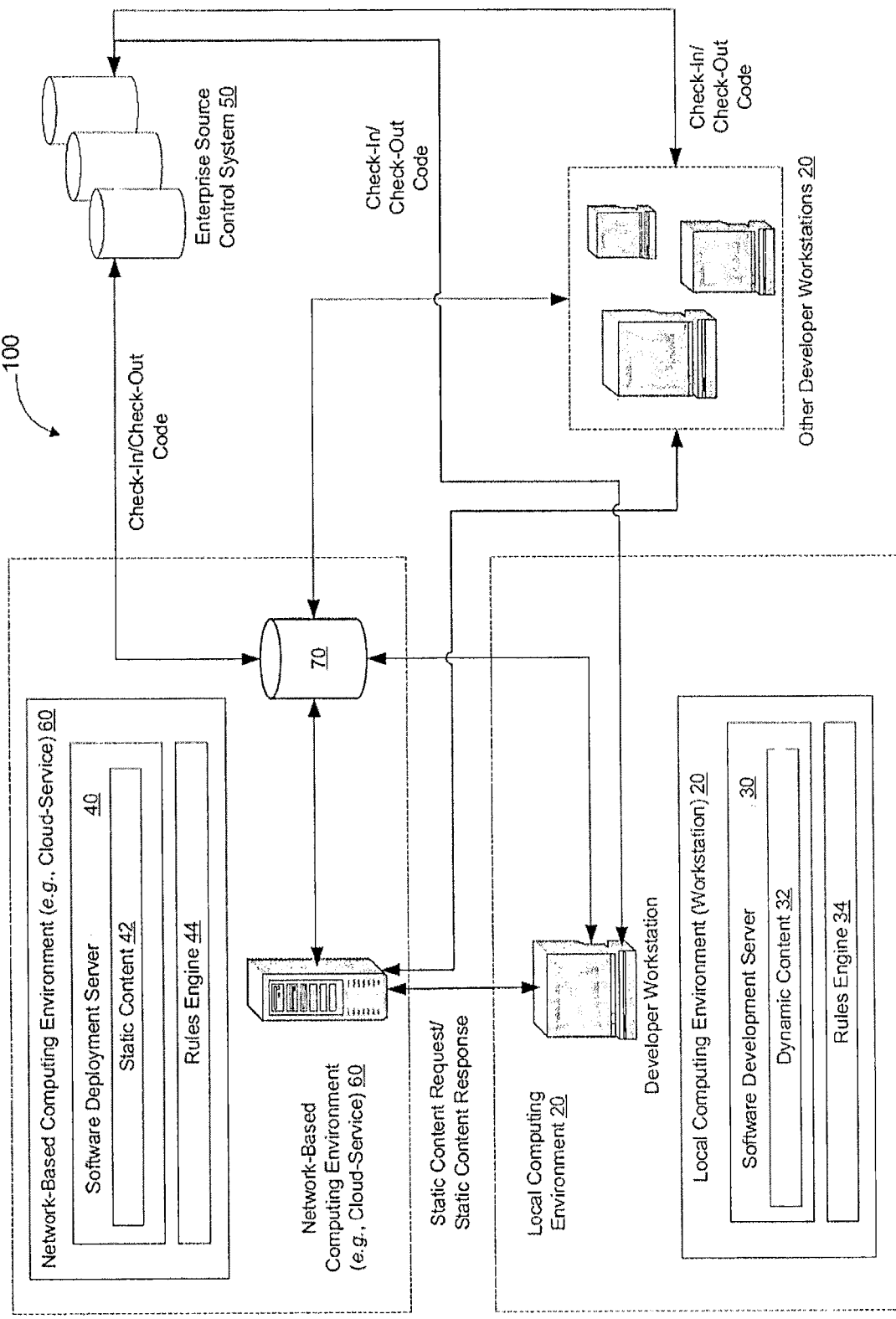
Figure 3:
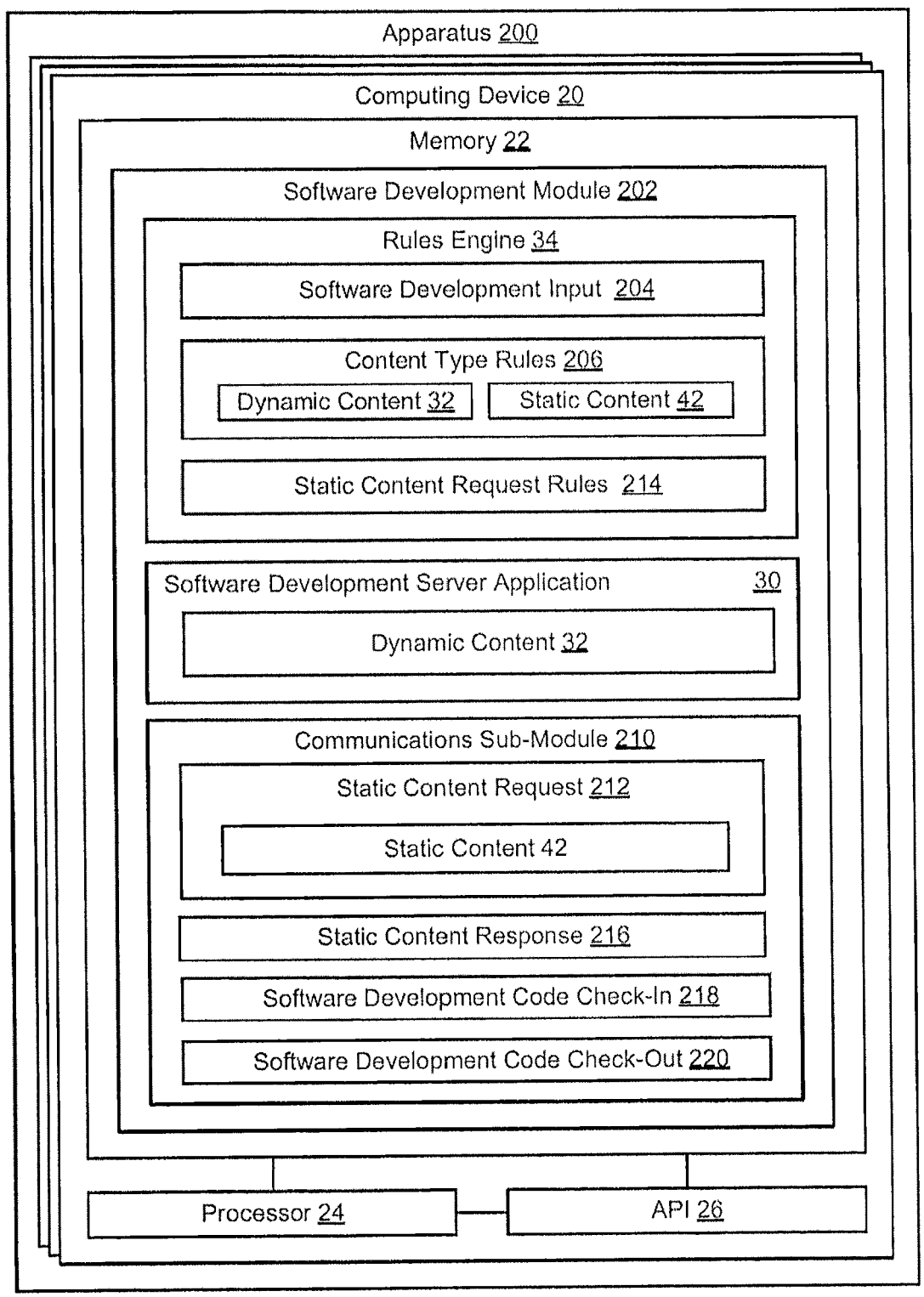
Figure 4:
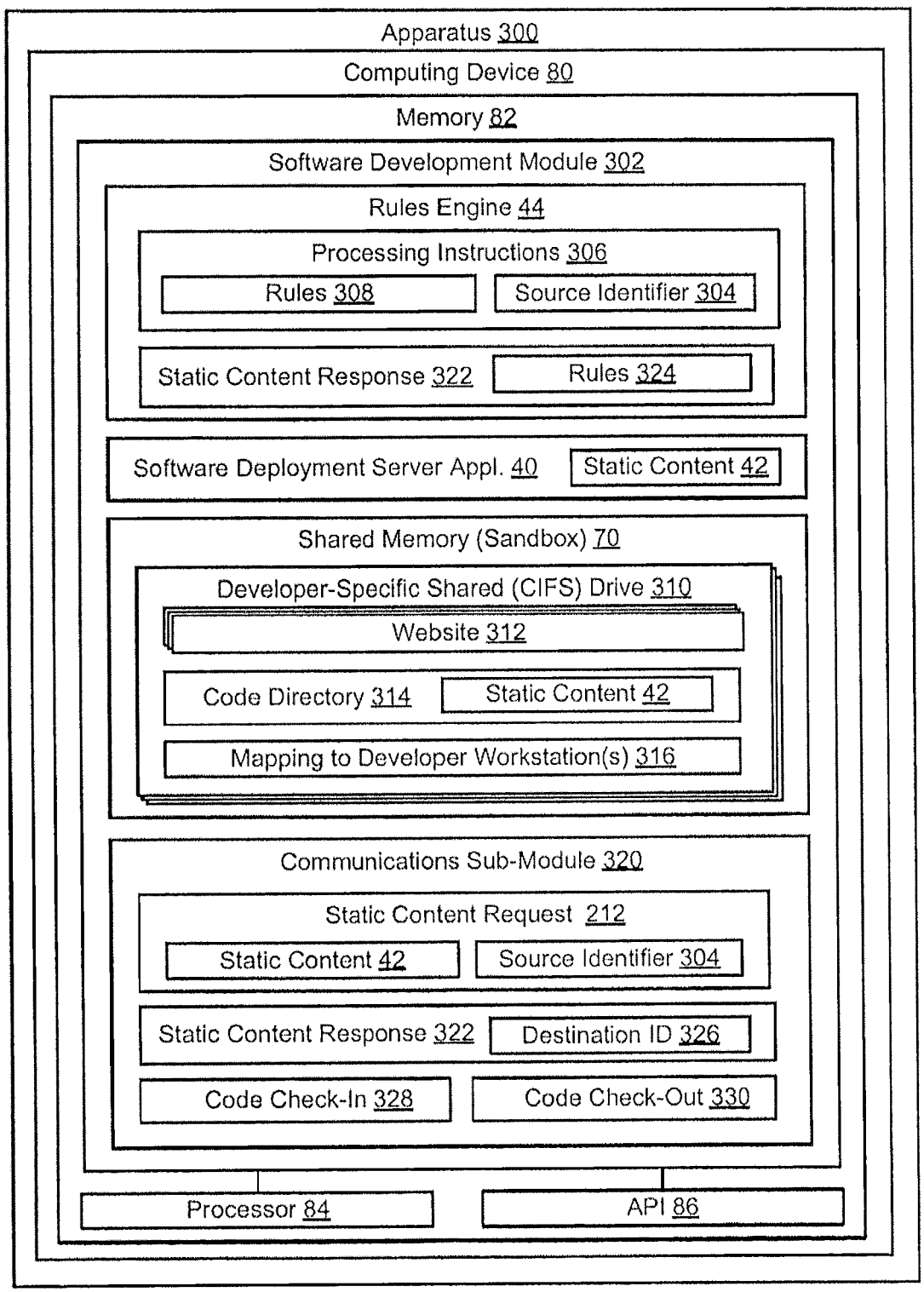
Figure 5:
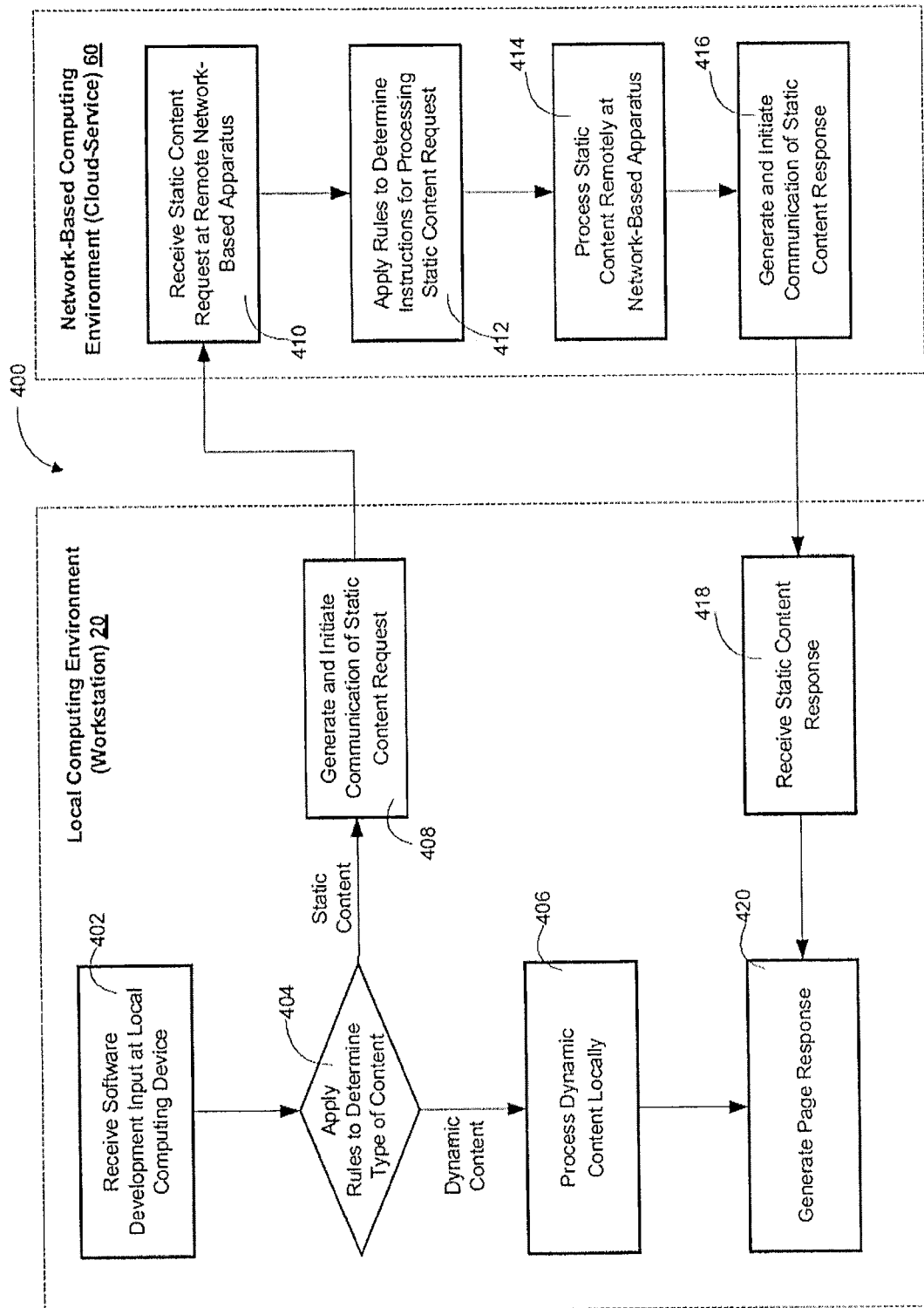

Having thus described embodiments of the invention in general terms, reference will now be made the accompanying drawings, wherein:

FIG. 1 provides a schematic diagram of a system for software development, in accordance with the prior art;

FIG. 2 provides a schematic diagram of an exemplary hybrid system for software development, in accordance with embodiments of the present invention;

FIG. 3 provides a block diagram of a local computing environment apparatus used in a hybrid system for software development, in accordance with embodiments of the present invention;

FIG. 4 provides a block diagram of a network-based apparatus used in a hybrid system for software development, in accordance with embodiments of the present invention; and FIG. 5 provides a flow diagram of a method for hybrid software development, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for hybrid software development processing in which dynamic content processing occurs locally at each developer's computing device, while static content processing occurs remotely via a network-based software deployment server. In this regard, the invention provides for the software deployment server, for example a web server, to be removed from the local computing environment (e.g. the developer's desktop) and implemented in a remote shared server environment (e.g., a cloud-based environment or the like) in which multiple developers call-on the software deployment server for processing static content.

As such, the present invention is able to provide for efficient code development, since the bulk of the processing, i.e., the processing of dynamic content, occurs within the local computing environment, while processing of less frequent static content (e.g., content that is not dynamically rendered, such as images, style pages, and the like) occurs remotely in the shared server environment.

Moreover, since the deployment/web server software is executed on a server-class device, as opposed to being executed locally on a desktop-class device, enterprises are able to insure that the server-class devices are updated, in a timely fashion, with required security patches, vendor updates and the like. As a result, the present invention, lessens security risks posed to the enterprise that would otherwise be evident in the event deployment/web server software is executed at the local computing level.

In addition, the centralized network-based server resources, provides optimal resource utilization, in that, multiple developers can transparently access the centralized shared server simultaneously and the file/code transfer between the network-based server(s) and the local computing devices can occur seamlessly and in real-time.

Specifically, the present invention implements a rules engine at the local computing level that determines whether a software development input includes content of a dynamic type or static type. Content of a dynamic type is content that is processed/updated more frequently in the software development process, while content of a static type is content that is processed/updated less frequently. For example, content of a static type may include images, page layout, style pages and the like. In specific embodiments of the invention, enterprise-specific rules define which content is static type and which content is dynamic type. Content that is determined to be of a dynamic type is processed locally by software development server software (scripting language server, such as JavaServer Pages™ (JSP), Hypertext Preprocessor (PHP), Active Server Pages (ASP) or the like), while content that is determined to be of a static type results in processing requests being communicated from the local computing environment to the network-based/cloud computing environment.

In addition, the network-based/cloud computing environment implements a Common Internet File System (CIFS), which provides for multiple developer-specific websites to be created on individual shared drives, so that the web server environment can be personalized on a per-developer basis (i.e., developer-specific coding and testing of their software being developed) and implemented by multiple developers in parallel. Further, the network-based servers are configured to uniquely identify each developer and redirect requests transparently to specific application code directories hosted on the CIFS drives.

Moreover, the present invention provides for mapping the web content deployed on the shared software development server to each individual developer's local computing device (e.g., desktop/laptop or the like). The mapping of web content to the local computing device, provides for the developers to be able to develop code on their respective local computing device and have the developed code transparently deployed within the remote software deployment server.

Referring to FIG. 1, a schematic diagram is provided of a system 10 for software development, in accordance with the prior art. The local computing environment, which may comprise workstations 20 or the like is configured to perform all of the processing. In this regard, the workstations 20 include both a software development server application 30 (e.g., JavaServer Pages™ (JSP), Hypertext Preprocessor (PHP), Active Server Pages (ASP) or the like) and a software deployment server application 40 (e.g., a web server application, such as an APACHE® server application or the like). In response to a developer/user input/request, the local computing device (i.e., workstation 20) processes the code and returns a response. Code that is being developed is stored locally, at the workstation 20 or an associated storage device, and is periodically (e.g., at the end of a developer's work session) checked-in to the enterprise source control system 50. The enterprise source control system 50 is configured to correlate code updates from various developers who check-in their respective code developments to the source control system 50 at prescribed intervals.

However, the system shown and described in FIG. 1 poses problems from a risk standpoint. Specifically, by implementing software deployment server applications (e.g., a web server application, such as an APACHE® server application or the like) on workstations/desktops, which are not classified by the enterprise as server-class devices, the enterprise may not be able to insure that the workstations are updated, or updated as timely as needed, with the required security patches, vendor releases or the like. Such unpatched and/or non-updated deployment server applications pose a serious security and/or compliance risk to the enterprise. In addition, as previously discussed, other known software development systems may be hosted development platforms, in which all of the content processing is performed in a hosted network-based environment. However, while such an environment may allow for the enterprise to have better control over the software deployment server applications (thus, mitigating risk), such systems have traditional been inefficient in terms of processing time.

Referring to FIG. 2, a schematic diagram is provided of a system 100 for hybrid software development, in accordance with embodiments of the present invention. Specifically, according to embodiments described herein, dynamic content is processed locally at the workstation 20 level, while static content is processed at the network-based computing environment 60, for example, a cloud-based computing service or the like). As such, the workstations 20 are configured to includes a software development server application 30 (e.g., JavaServer Pages™ (JSP), Hypertext Preprocessor (PHP), Active Server Pages (ASP) or the like) for processing dynamic content 32 and the network-based computing environment is configured to host a software deployment server application (e.g., a web server application, such as an APACHE® server application or the like) for processing static content 42.

In this regard, workstations 20 are configured to execute a content rules engine 34 that is configured to determine, based on enterprise-specific predetermined rules, whether a developer requests includes dynamic content 32 or static content 42. Dynamic content 32 is characterized as content which is rendered/updated more frequently, while static content 42 is content that rendered/updated less frequently. For example, static content 42 may include, but is not limited to, images, page layout, style pages and the like. In response to the rules engine 34 determining that a developer request/input includes dynamic content 32, the dynamic content 32 is processed locally by the software development server application 30. In response to the rules engine 34 determining that a developer request/input includes static content 42, a static content request is generated and communicated to the network-based computing environment 60.

The network-based computing environment 60 receives the static content request and implements rules engine 42 to (i) identify the source of the static content request, (ii) determine, based on the source and preconfigured rules, processing instructions for the static content request and (iii) identify a destination for the response to the static content request. In this regard, the static code is deployed on the software deployment server 40 on-the-fly from shared memory 70, otherwise referred to as developer database or a "sandbox". The software deployments server(s) 40 are configured to uniquely identify each source/developer and redirect requests transparently to specific application code directories hosted on the shared memory 70 (e.g., Common Internet File System (CIFS) drives).

In addition, the shared memory 70 of network-based/cloud computing environment 60 provides for multiple developer-specific websites to be created on developer-specific shared drives (e.g., CIFS), so that the web server environment can be personalized on a per-developer basis (i.e., developer-specific coding and testing of their software being developed) and implemented by multiple developers in parallel.

Moreover, according to embodiments of the present invention, the web content deployed on the shared software development server 40 is mapped to each individual developer's local computing device/workstation 20. The mapping of web content to the local computing device/workstation 20, provides for the developers to be able to develop code on their respective local computing device and have the developed code transparently deployed within the remote software deployment server 40.

In response to processing the static content 42 within the software deployment server application 40, the network-based computing environment 60, implements the rules engine 44 to generate a static content response, which is subsequently communicated to the workstation 20, which communicated the initial static content request. It should be noted that the communication of the static content request, processing of the request and communication of the static content response occur in real-time, such that, the processing via the network-based computing environment 60 is transparent to the developer/user.

Additionally, as shown in FIG. 2, code check-ins and/or check-outs with the enterprise source control system 50 may occur via the shared memory 70 or via the workstations 20. For example, the shared memory 70 may be configured to only check-in and/or check-out static content updates from the plurality of developers or, in those embodiments of the invention in which the workstations 20 communicate their respective dynamic content to the shared memory 70, the shared memory 70 may be configured to check-in/check-out both dynamic and static content updates. In other embodiments of the invention, in which the shared memory checks-in and checks-out the static content updates, the workstations may be configured to only directly check-in the dynamic content updates with the enterprise source control system 50, while in other embodiments of the invention, the workstations 20 may be configured to directly check-in and check-out the dynamic and static content updates with the enterprise source control system 50.

Referring to FIG. 3 a block diagram is presented of the apparatus 200, which is configured for hybrid software development at the local computing level, in accordance with embodiments of the present invention. In addition to providing greater detail, FIG. 3 highlights various alternate embodiments of the invention. The apparatus 200 may include one or more of any type of computing devices 20, such as one or more workstations, desktops, laptops or the like suitable for a developer to implement for the purpose of software development. The present apparatus and methods can accordingly be performed on any form of one or more computing devices.

The computing devices 20 includes a memory 22, which may comprise volatile and non-volatile memory, such as read-only and/or random-access memory (RAM and ROM), EPROM, EEPROM, flash cards, or any memory common to computer platforms. Further, memory 22 may include one or more flash memory cells, or may be any secondary or tertiary storage device, such as magnetic media, optical media, tape, or soft or hard disk. Moreover, memory 22 may comprise cloud storage, such as provided by a cloud storage service and/or a cloud connection service.

Further, computing devices 20 also includes one or more processors 24, which may be an application-specific integrated circuit ("ASIC"), or other chipset, processor, logic circuit, or other data processing device. Processor 24 or other processor such as ASIC may execute an application programming interface ("API") 26 that interfaces with any resident programs, such as software development module 202 and routines, sub-modules associated therewith or the like stored in the memory 22 of the computing devices 20.

Processor 24 includes various processing subsystems (not shown in FIG. 3) embodied in hardware, firmware, software, and combinations thereof, that enable the functionality of apparatus 200 and the operability of the apparatus on a network. For example, processing subsystems allow for initiating and maintaining communications and exchanging data with other networked devices, such as the network-based computing environment shown in FIG. 2. For the disclosed aspects, processing subsystems of processor 24 may include any subsystem used in conjunction with software development module 202 and related algorithms, sub-algorithms, modules, sub-modules thereof.

The memory 304 of apparatus 300 stores software development module 202 that is configured to provide for local processing of the hybrid software development system, in accordance with embodiments of the present invention.

As previously noted, software development module 202 includes rules engine 34 that is configured to implement content type rules 208 to determine whether a developer's request input 204 includes dynamic content 32 and/or static content 42. As previously noted, the content type rules 206 may be enterprise-specific or specific to a portion of an enterprise (e.g. specific software development unit/team), an application being developed and/or a developer. Dynamic content is content that is updated/processed more frequently, while static content is updated/processed less frequently (e.g., images, page layout, style pages and the like). In response to the rules engine 34 determining that the software development request/input 204 includes dynamic content 32, software development server 30 (e.g., JavaServer Pages™ (JSP), Hypertext Preprocessor (PHP), Active Server Pages (ASP) or the like) is deployed to process the dynamic content 32.

In response to the rules engine 34 determining that the software development request/input includes static content 42, the rules engine 34 may be implemented to generate a static content request 212 based on static content request rules 214. The static content request rules 214 may be specific to the static content, the developer, the application, the enterprise or the like. Once the static content request 212 has been generated, communications sub-module 210 is implemented to initiate communication of the request 212 to the network-based computing environment (60 of FIG. 2). Further, communications sub-module 210 is configured to transparently and in real-time receive a static content response 216 from the network-based computing environment.

Further, communications sub-module 210 is configured to, in response to developer/user input or automatically, initiate communication of software development code check-in(s) 218 to the enterprise source control system (50 of FIG. 2). As previously noted, the check-ins may include dynamic and, in some embodiments, static content updates. Code check-ins may occur at the end of a developer's work session or automatically at predetermined intervals. Moreover, communications sub-module 210 is configured to, in response to developer/user input or automatically, receive communication of software development code check-out(s) 220. Code check-outs may occur at the onset of a developer's work session.

Referring to FIG. 4 a block diagram is presented of the apparatus 300, which is configured for hybrid software development at the network-based level, in accordance with embodiments of the present invention. In addition to providing greater detail, FIG. 4 highlights various alternate embodiments of the invention. The apparatus 300 may include one or more of any type of computing device 80, such as one or more servers, storage devices or the like. The present apparatus and methods can accordingly be performed on any form of one or more computing devices.

The apparatus 900 includes computing devices 80 that can receive and execute algorithms, such as routines, and applications. Computing devices 80 includes memory 82, which may comprise volatile and non-volatile memory, such as read-only and/or random-access memory (RAM and ROM), EPROM, EEPROM, or any memory common to computer platforms. Further, memory 82 may comprise cloud storage, such as provided by a cloud storage service and/or a cloud connection service.

Further, computing devices 80 also include one or more processors 84, which may be an application-specific integrated circuit ("ASIC"), or other chipset, processor, logic circuit, or other data processing device. Processors 84 or other processor such as ASIC may execute an application programming interface ("API") 86 that interfaces with any resident programs, such as software development module 302 and routines, sub-modules associated therewith or the like stored in the memory 82 of the computing devices 80.

Processor 84 includes various processing subsystems (not shown in FIG. 4) embodied in hardware, firmware, software, and combinations thereof, that enable the functionality of apparatus 300 and the operability of the apparatus 300 on a network. For example, processing subsystems allow for initiating and maintaining communications and exchanging data with other networked devices, such as those databases and servers shown in FIG. 2. For the disclosed aspects, processing subsystems of processor 84 may include any subsystem used in conjunction with software development module 302 and related algorithms, sub-algorithms, modules, sub-modules thereof.

The memory 82 of apparatus 300 stores software development module 302 which that is configured to provide for network-based processing for the hybrid software development system, in accordance with embodiments of the present invention.

As previously noted, software development module 302 includes communications sub-module 320 that is configured to receive static content requests 212 from a plurality of workstations/developers. The static content request 212 includes the static content 42 to be processed and a source identifier 304 that identifies the source (e.g., developer and/or workstation associated with a specific developer) of the request.

Additionally, software development module 302 includes rules engine 44 that is configured to determine processing instructions 306 for the static content based on predetermined rules 308 and source identifier 304. In this regard, the rules engine 44 implements predetermined rules 308 to establish isolated and developer-specific "sandboxes" within the shared memory 70.

Further, software development module 30 includes software deployment server application 40 (e.g., a web server application, such as APACHE® server application or the like) that is configured to process the static content 42. In this regard, the software deployment server application 40 is configured to redirect the static content request 212 to developer-specific application code directories 322 hosted on developer-specific shared drives 310, such as Common Internet File System (CIFS) drives or the like within a shared memory 70, referred to herein as a developer database)".

Moreover, the shared memory 70 is configured to create multiple websites 312 on individual developer-specific shared drives 310 so that the network-based computing environment can be personalized for each developer and shared by multiple developers simultaneously.

In addition, the shared memory 70 is configured such that the web content deployed on the shared drive 310 is mapped 316 directly to each developer's workstation. Such mapping of the web content to the workstations allows for developers to develop/work on code from their respective workstations while the code transparently is deployed on the network-based software deployment server application 40.

Further, in response to processing the static content, the rules engine 34 is configured to generate a static content response 322 based on predetermined content response rules. In response to generating the static content response, the communication sub-module 320 initiates communication of the response to an identified destination 324 (e.g., the source from which the static content request was sent or as otherwise identified in the request).

Further, communications sub-module 320 is configured to, in response to developer/user input or automatically, initiate communication of software development code check-in(s) 326 to the enterprise source control system (50 of FIG. 2). As previously noted, the check-ins 326 may include static content updates and, in some embodiments in which the local computing devices communicate their dynamic content updates through the shared memory 70, the check-ins may include dynamic content updates. Moreover, communications sub-module 320 is configured to, receive communication of software development code check-out(s) 220, such as static code check-outs or the like.

Referring to FIG. 5, a flow diagram is presented of a method 400 for hybrid software development, in accordance with embodiments of the present invention. At Event 402, a software development input is received at a local computing environment 20 (e.g., workstation/desktop or the like). At Decision 404, predetermined rules are applied, via rules engine, to determine whether the input includes static content and/or dynamic content. As previously noted the predetermined rules may be enterprise-wide rules, or specific to a software development group, the application being developed and/or the developer. Static content is content updated less frequently, for example, images on web pages, web page layout, style pages and the like, while dynamic content is updated more frequently.

If Decision 404 results in a determination of dynamic content, at Event 406, the dynamic content is processed locally by a software development server application (e.g., JavaServer Pages™ (JSP), Hypertext Preprocessor (PHP), Active Server Pages (ASP) or the like).

If Decision 404 results in a determination of static content, at Event 408, a static content request is generated and communication of the request to a network-based computing environment 60 is initiated.

At Event 410, the static content request is received by a remote network-based apparatus, such as a server implementing a software deployment server application (e.g., a web server application, such as APACHE® Server or the like). The network-based apparatus is configured to identity a source of the request and, at Event 412 apply predetermined rules to determine instructions for processing the static content request. The predetermined rules may be source/developer-specific (e.g., take into account rules associated with the geographic location of the developer, the role/classification of the developer and the like) and/or specific to the code/application being development, a development group/organization within the enterprise, or enterprise-wide rules.

At Event 414, the static content is processed remotely via the software deployment server application in accordance with the determined instructions. In this regard, the software deployment server application is configured to redirect the request transparently to developer specific directories hosted on a Common Internet File System (CIFS) drive. The CIFS drive provides for multiple developer-specific websites to be generated thereon, so that multiple developers can work (i.e., process static content requests) in parallel.

At Event 416, predetermined rules may be applied to generate a static content response and initiate communication of the static content response to an identified destination (e.g., the static content source or the like). At Event 418, the local computing environment 20 receives the static content response 418. As previously discussed Events 408-418 occur in real-time and are transparent to the developer, as such the developer may be unaware that processing is occurring outside of the local computing environment (i.e., at the network-computing environment). At Event 420, in response to processing dynamic content (Event 406) and/or receiving static content response (Event 418), page response/updates are generated and stored locally in memory.

Thus, systems, apparatus, methods, and computer program products described above provide for a hybrid software development system in which dynamic content processing occurs locally at each developer's computing device, while static content processing occurs remotely via a network-based software deployment server. Such hybrid software development processing occurs on-the-fly in a seamless, transparent fashion, such that, the developers are unaware that portions of the processing are occurring, in real-time, remotely. Moreover, through creation of multiple application websites on a Common Internet File System (CIFS) drive, multiple developers can work in parallel and by configuring the network-based server to uniquely identify each developer, so that requests can transparently redirected to developer-specific application coder directories hosted on the CIFS drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for hybrid software development, the system comprising:
   a distributed computing network;
   a plurality of computing devices located throughout the distributed computing network, each computing device having a first memory and at least one first processor in communication with first memory;
   a first software development module stored in the first memory, executable by the at least one first processor configured to develop software in response to user inputs and including:
      a first rules engine configured to determine, based on first preconfigured rules, for each software development input provided by a user whether the input requires processing of dynamic type content or static type content, wherein the dynamic type content is rendered or updated more frequently than the static type content and wherein the static type content includes images, style pages and page layout;

a software development server application configured to locally process the determined dynamic type content; and a communication sub-module that is configured to, in response to the first rules engine determining that a software development input requires processing of the static type content, (i) create, based on second preconfigured rules, a static content request that includes the static type content, a source identifier and a destination identifier and (ii) initiate network communication of the static content request, wherein the static content request is configured to request that a computing apparatus process the static type content;

the computing apparatus located within the distributed computing network and remote from the plurality of first computing devices, the computing apparatus having a second memory and at least one second processor in communication with the second memory; and a second software development module stored in the second memory, executable by the at least one second processor and including:

a software deployment server application configured to receive static content requests including the static content request from the plurality of computing devices and process the static type content as requested in the static content requests by implementing a second rules engine configured to (i) identify, from the source identifier in the static content requests, one of the plurality of computing devices and the user developing the software as a source of a static content request received from the first software development module, (ii) determine, based on third preconfigured rules that are specific to a software type being developed and at least one of (a) the one of the plurality of computing devices and (b) the user, processing instructions for the static content request, and (iii) identify, from the destination identifier in the static content request, a destination for communicating a response to the static content request, and (iv) initiate network communication of the response including the processed static content to the identified destination.

2. The system of claim 1, wherein the computing apparatus further comprises a developer-specific shared drive that stores developer-specific websites, wherein the shared drive provides for multiple developers to access websites simultaneously.

3. The system of claim 2, wherein the developer-specific shared drive further comprises developer-specific code directories that are configured to receive and process the static content requests redirected from the software deployment server application.

4. The system of claim 2, wherein the developer-specific shared drive is further configured to map developer-specific web content deployed on the shared drive to at least one of the computing devices.

5. The system of claim 1, wherein the second software development module further includes a communications sub-module configured to create, based on fourth preconfigured rules, the response and initiate the network communication of the response to the identified destination.

6. The system of claim 1, wherein the computing apparatus is further defined as a cloud-based service.

7. The system of claim 1, further comprising a source control sub-system located within the distributed computing network comprising a third memory and at least one third processor in communication with the third memory, wherein the source control sub-system is configured to seamlessly synchronize code developed at each of the plurality of computing devices with a stored baseline of the software being developed.

* * * * *